April 2, 1935. L. J. RODGERS 1,996,653
COMBINATION KIT
Original Filed Dec. 27, 1933   2 Sheets-Sheet 1
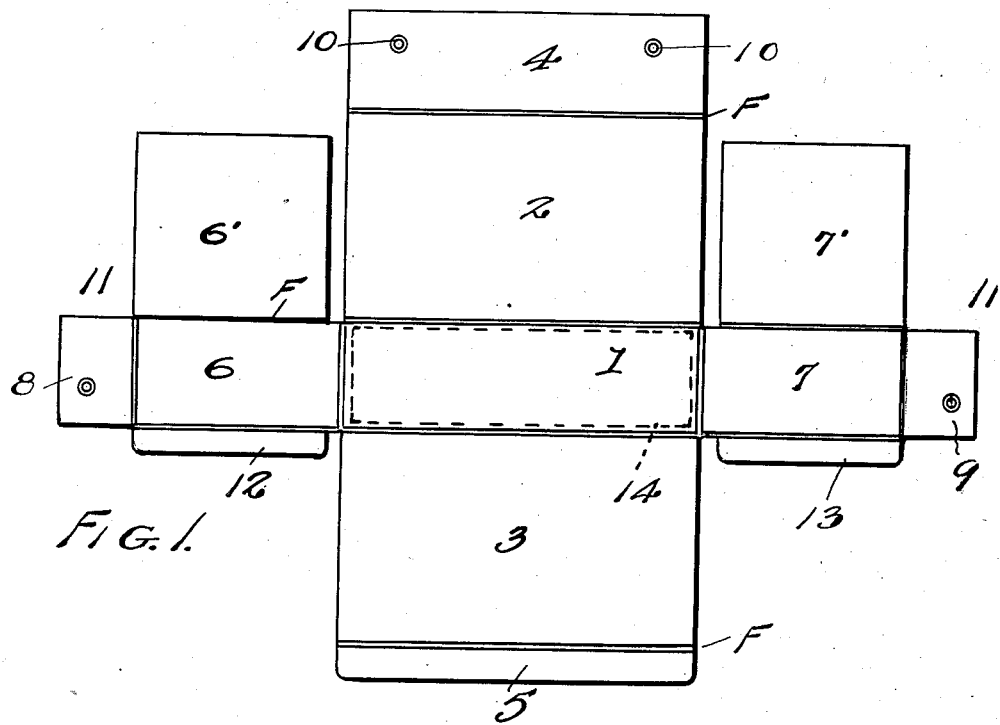
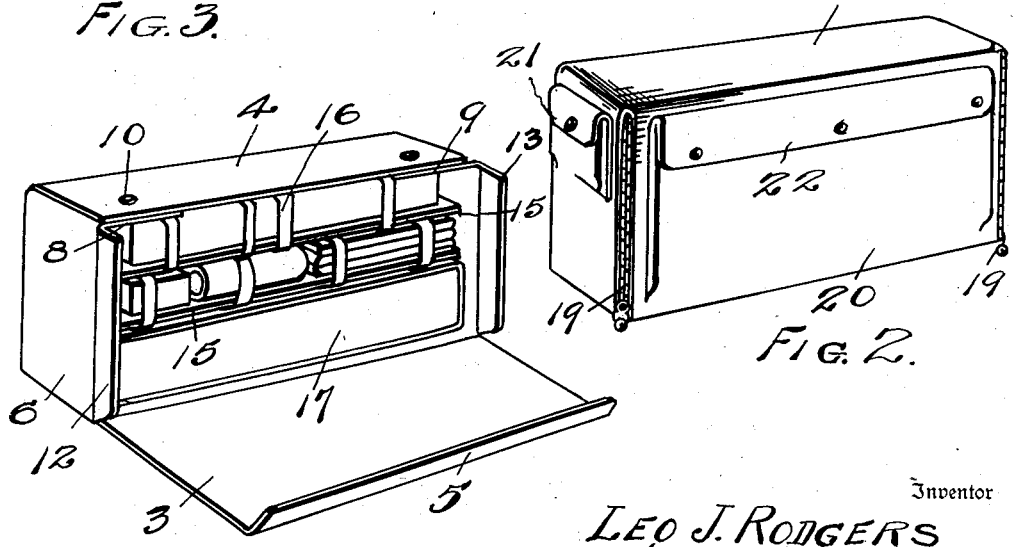
Inventor
LEO J. RODGERS
By Thomas R. Harney
Attorney April 2, 1935.   L. J. RODGERS   1,996,653
COMBINATION KIT
Original Filed Dec. 27, 1933   2 Sheets-Sheet 2
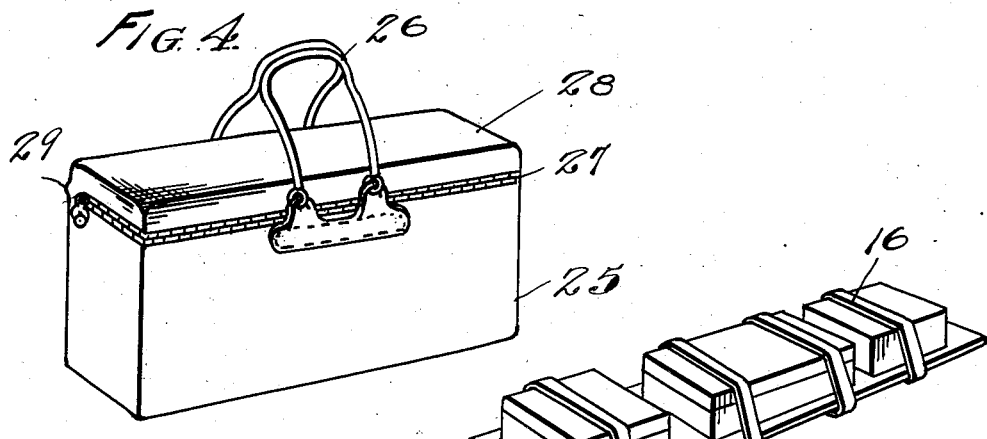
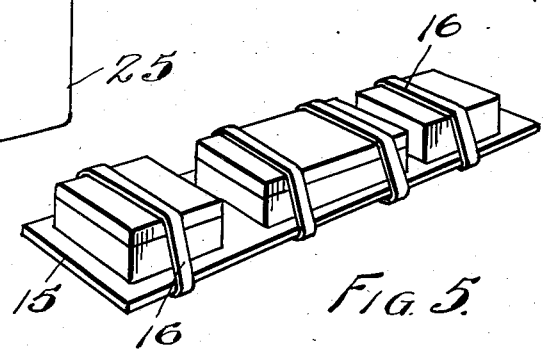
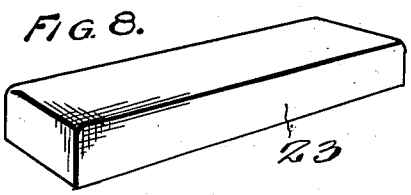
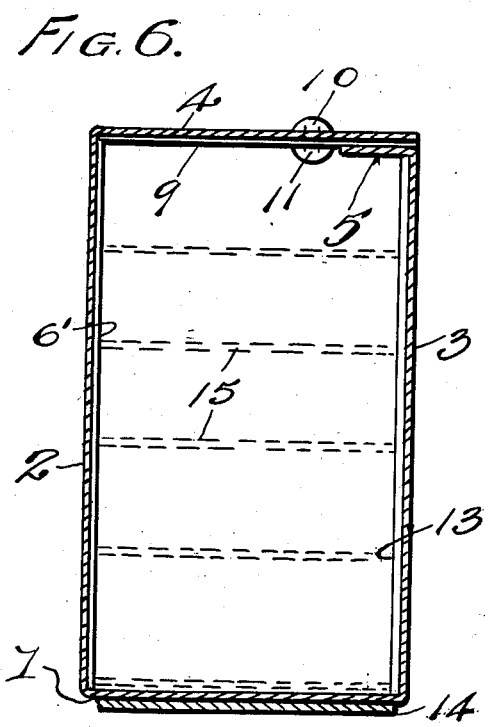
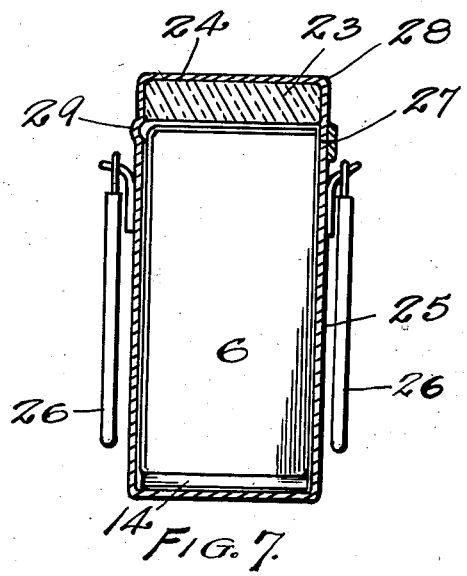
Inventor
LEO J. RODGERS
By Thomas R. Harney
Attorney Patented Apr. 2, 1935

1,996,653

UNITED STATES PATENT OFFICE 1,996,653

COMBINATION KIT

Leo J. Rodgers, Highland Park, Mich.

Application December 27, 1933, Serial No. 704,154
Renewed February 28, 1935

3 Claims. (Cl. 150—52)

My present invention relates to a combination kit or convenience outfit, including a knockdown box or container, and a bag or cover therefor which may be of the shopping-bag type, together with various accessories, which are all combined in compact form and shape, whereby the kit is rendered adaptable for numerous purposes or uses. Means are provided whereby the kit may be securely closed against loss or displacement of parts, and with equal facility the kit may be opened in order to gain access to its interior parts. Within the box of the kit may be packed culinary utensils, lunches, first aid equipment, clothing, and other commodities required by the traveler, tourist, camper, and others, and when so packed, or when the kit is empty, the outfit is especially adapted for use as a portable arm rest by motorists and others travelling in vehicles. When thus employed the kit provides a convenient and comfortable, as well as a dignified and cushioned arm rest for the traveller, which arm rest fits snugly against the interior upholstery of an automobile and gently conforms to the body positions of either the driver or a passenger of an automobile. The kit may also be employed by campers, hikers, tourists, sportsmen, and others, as a portable seat, as for example by fishermen when enjoying their piscatorial art, or sport.

By the combination and arrangement of the parts of the kit or outfit, a light but strong and durable construction is insured; the pack may with facility be made up; access may be had to the interior of the kit when desired; and the box or inner section of the kit may be opened for use in manner similar to a cupboard.

The invention consists in certain novel combinations and arrangements of parts as will hereinafter be more fully set forth and claimed. In the accompanying drawings I have illustrated one complete example of the physical embodiment of my invention, but it will be understood that changes and alterations may be made in the exemplified structure with regard to sizes, shapes, as well as in the uses of parts, within the scope of my claims, without departing from the principles of my invention. I therefore desire the following description and accompanying drawings of my invention to be taken in a broad sense, rather than as limiting me to the specific exemplification of the invention.

In the drawings:

Figure 1 is a plan view of the foldable blank from which the box, forming the inner section of the kit, is fashioned.

Figure 2 is a perspective view of the combination kit.

Figure 3 is a perspective view of the box or inner section of the kit, after the cover has been removed, and showing the box in open position to expose its contents to view, similar to a cupboard.

Figure 4 is a perspective view of the combination kit with a modified form of cover.

Figure 5 is a perspective view showing one of the box-trays or shelves, removed from the box, and illustrating several commodities stored or packed on the shelf.

Figure 6 is an enlarged detail sectional view of the box.

Figure 7 is a detail sectional view of the kit as shown in Figure 4, with the handles in lowered position.

Figure 8 is a perspective view of the cushion, detached from the kit.

In Figure 1 I have shown a blank from which the box or inner receptacle of the kit is fashioned, the blank being made from suitable material that is adapted for the purpose, and the blank is scored as at F to facilitate folding of its parts, in the formation of the box. The bottom panel is designated as 1, and this panel is joined by the two sides 2 and 3, one of the sides terminating in the top fold 4, and the other terminating in a closure flap 5 that is tucked into the top portion of the box to close the latter.

The one-piece blank is formed with two ends as 6 and 7, and these ends are provided with foldable half sections 6' and 7' that fold flat against the side 2, thus providing a double wall at the rear side of the box. These end pieces 6 and 7 are also fashioned with wings as 12 and 13 that fold into the open front of the box, and when the front 3 of the box is folded up and the closure flap 5 is tucked into the upper part of the box, these corner flaps or wings close the slight opening between the openable front 3 and the front edges of the ends 6 and 7 of the box.

On the extreme outer ends of the ends 6 and 7 I provide top tabs 8 and 9, and the top 4 of the box is provided with a snap fastening member, or two of such members as 10, 10, that co-act with complementary members 11, 11 of these top tabs. After the ends 6, 7, and the side 2 have been folded to upright position, and the half-sections 6' and 7' have been laid flat against the inner face of the back 2, these top tabs 8 and 9 are folded over to horizontal position and then the top 4 is folded over them. The two members of the two snap fasteners are then snapped together, thus forming the open box, as in Figure 3. To close the box, the front 3 is turned to upright position parallel with the back wall 2, and the closure tab or flap 5 that extends the length of the front wall 3 is tucked in under the top 4 and the two top-tabs 8 and 9. Before the front 3 is turned to closed position, however, the two corner wings 12 and 13 are turned inwardly from the position of Figure 3, and then the folded front lies against these two corner wings to close the corners and to be braced by the wings.

In the form of the invention shown particularly in Figure 2 the bottom of the box is exposed, and under these conditions I make use of an anti-slipping strip of felt, fabric, or other suitable material, as 14. This strip is cemented or otherwise secured against the outer face of the bottom 1 of the box, and it is designed to co-act with the upholstery of the automobile seat to prevent sliping of the kit when it is used as an arm rest. Thus the frictional contact between the anti-slipping strip and the top of the seat or upholstered cushion of the automobile prevents the kit from slipping out of place. In this connection it will be understood that the kit of Figure 2 may be used by a passenger, or by the driver of an automobile, as an arm rest, the kit being placed in position on the top of the automobile seat, at either side of the person, and extending lengthwise longitudinally of the automobile.

For convenience in storing commodities, as toilet articles, small tools, instruments, original packages for convenience and sanitation, and other emergency and auxiliary articles, and also for the purpose of reinforcing the interior structure of the kit, I provide a number of removable and separate trays or shelves as 15. These shelves or trays conform to the interior size and shape of the box, and they are adapted to receive and support the various enumerated articles, as well as other articles. For this purpose I utilize snap bands, or bands of rubber as 16, which are snapped around the shelf or tray and the articles on the shelf, as indicated in Figures 3 and 5. These bands may be the usual rubber bands, elastic tapes or loops, or other suitable material may be employed to snap around the shelf and article. The shelves are easily removed from the box and they may be handed from one person to another with convenience and without displacement or loss of the articles from the shelf.

I may also employ a box as 17 in Figure 3 that fits snugly in the inner section of the kit, and this box may be a lunchbox, thermos bottle container, or other receptacle that may be cause of convenience or necessity be required in the make-up of the kit. The shelves and the box 17, or a number of shelves omitting the box 17, may be stored within the inner section of the kit as indicated in Figure 3, and when the front of the kit is opened by pulling out the front wall 3, the various articles making up the contents of the box are in full view, and the desired article or articles may readily be selected, the tray or shelf removed, and the desired article may then be extracted from the shelf.

The box or inner section of the kit is encased within a flexible cover which may be fashioned of suitable material, and is quickly detachable from the box in order to gain access to the latter. The cover, as 18 in Figure 2 is preferably open at the bottom in order that the anti-slipping strip 14 on the bottom of the box may frictionally engage the upholstery of the automobile-seat when the kit is being employed as an arm rest. At the two front corners of the cover I provide quick detachable fastenings 19, 19, preferably of the interlocking, slide, type, and when these slide fasteners are disengaged, the front flap 20 of the cover is free to be turned up, in order that the front wall 3 of the box may be turned down and the box opened, as in Figure 3. The bag or cover 18 may be provided with exterior pockets as 21 and 22 in which various articles may be conveniently carried.

Within the top portion of the cover I provide a cushion 23, which as indicated at 24 in Figure 7 may be cemented to the inner side of the top portion of the cover, or other means may be used for securing the cushion to the cover. The cushion is fashioned of resilient material, as rubber, and is of proper size and shape to neatly fit within the top of the cover and rest upon the top of the enclosed box or inner section of the kit. In Figure 2 in which the cushion is located in the top of the cover 18, the latter may be grasped by hand and the enclosed cushion or pad 23 forms a hand-grasp by means of which this open-bottom cover may be removed from the enclosed box, if it is not desired to release the fastenings 19, 19.

It will be apparent that the cushion or resilient pad 23 provides a soft and comfortable rest for the fore-arm or elbow, and the cushion effect of the arm rest is enhanced by the cushion of the automobile seat, which latter "gives" under shocks and vibrations of the traveling vehicle, and these shocks are absorbed by the cushion parts before they reach the body of the passenger.

In Figure 4, the cover 25 encloses the box or inner section of the kit and the cushion or pad 23 rests on the box as indicated in Figure 7. This cover is of the shopping-bag type, and is provided with flexible handles 26, and in lieu of the two corner slides 19, 19, I provide one continuous, horizontal slide fastener 27 that extends forward at one end of the cover, thence across the front of the cover, and then back toward the rear of the other end of the cover. Thus the slide fastener in Figure 4 may be slid to the front of the cover, around one corner, thence across the front and around the far corner, toward the rear of the cover, to release the openable top portion 28. At its rear, the flexible cover is scored or ribbed as at 29, to facilitate folding back of the top portion or lid 28 in order to gain access to the enclosed box.

In either or both forms of covers herein illustrated, means are provided for quickly detaching the cover from the box in order that the latter may readily be withdrawn when access is desired to the interior contents of the box.

While I have enumerated various uses for which the kit and its parts are adaptable, it will readily be apparent that many other emergency and auxiliary wants may be filled by the use of the kit, as for instance, the cover, with its pad, when removed from the box may be employed as a seat-cover when the user occupies a hard seat on the bleachers, or the flattened cover may be used as a knee-pad when working about an automobile. The combination kit is adapted for convenient use as a doctor's emergency kit, or as an overnight bag, or as a nursery-kit when traveling.

Having thus fully described my invention, what I claim as new and desire to secure by Letters Patent is:—

1. In a combination kit adapted for use as an arm rest, the combination with a box having an anti-slipping element on its outside bottom face, of an open-bottom, flexible cover enclosing the box, and a resilient pad secured within the top of the cover resting on the top of the box.

2. In a combination kit adapted for use as an arm rest, the combination with a folded box having an unfoldable front and an exterior anti-slipping element on its bottom, of an open-bottom flexible cover enclosing the box, and a resilient pad confined within the top of the cover resting on the top of the box.

3. In a portable combination kit adapted for use as an arm rest, the combination with a foldable semi-rigid box having an unfoldable-front and means including a plurality of horizontally disposed shelves in said box forming a self support for the kit, of a flexible cover for the box, a resilient-pad secured within the top of the cover and resting on the top of the box, an openable front portion to said cover, and means for fastening said front portion.

LEO J. RODGERS.